United States Patent Office 3,751,399
Patented Aug. 7, 1973

3,751,399
POLYACRYLATE RESIN COMPOSITIONS
Henry L. Lee, Jr., San Marino, and Donald G. Stoffey, Hacienda Heights, Calif., assignors to Lee Pharmaceuticals, South El Monte, Calif.
No Drawing. Filed May 24, 1971, Ser. No. 146,467
Int. Cl. A61k 5/02; C09k 3/00
U.S. Cl. 260—47 UA
28 Claims

ABSTRACT OF THE DISCLOSURE

Compositions of aromatic and alicyclic polyacrylate compounds comprising from 25% to 90% by weight of a polyacrylate of the formula:

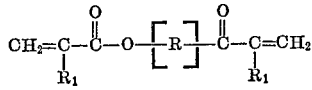

wherein
$R_1$ is hydrogen or alkyl of 1 to 4 carbons; and
R is:
(a)

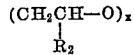

wherein x is an integer of 1 to 5, and $R_2$ is hydrogen or an alkyl of 1 to 4 carbon atoms;
(b) $CH_2(CH_2)_yCH_2O$, wherein y is an integer of 1 or 2;
(c)

or
(d)

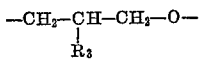

wherein $R_3$ is OH or

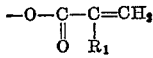

and $R_1$ has the same meaning as above;
and 10 to 75% by weight of an aromatic or alicyclic polyacrylate compound are utilized in various dental restorative applications. A particularly suitable composition is one comprising BIS-GMA and triethylene glycol dimethacrylate.

BACKGROUND OF THE INVENTION

Field of the invention

This invention is related to aromatic and alicyclic, thermosetting acrylic resin compositions comprising mixtures of aromatic and alicyclic polyacrylic resins with 25% to 90% by weight of certain aliphatic and aliphatic ether di- and polyacrylates.

DESCRIPTION OF THE PRIOR ART

Thermosetting acrylic esters of aromatic and alicyclic compounds have been used in the past for a variety of purposes including the potting of electrical coils and use in dental restorative compositions. Various examples of such compounds are disclosed in U.S. 2,890,202.

The use of such acrylic resins as binders in dental restorative compositions is disclosed, for example, in detail in U.S. 3,066,112, U.S. 3,179,623, and U.S. 3,539,533.

While such prior art acrylic resin compositions have proved quite useful, it is known that the degree of cure and magnitude of compressive strength and other important physical properties that have been attained are much lower than would be predicted theoretically.

In addition, many of such prior art aromatic and alicyclic acrylic resin compositions are extremely viscous and have gel times much longer than is desirable for many purposes.

The viscosity of aromatic and alicyclic polyacrylate compounds has been adjusted somewhat in the past by the addition of minor amounts of reactive diluents such as methyl methacrylate, triethylene glycol dimethacrylate, ethylene glycol dimethacrylate, and tetraethylene glycol dimethacrylate, up to a maximum of 15% of the total amount of resin present. Such systems are disclosed for example in U.S. 3,066,112 and U.S. 3,539,533.

One approach disclosed in U.S. 3,539,533 for increasing the compressive strength of such resin systems, in this case in a dental restorative composition, comprises blending finely divided filler and bisphenol-A-dimethacrylate with BIS-GMA, together with a maximum amount of 15% by weight of the reactant diluent, preferably triethylene glycol dimethacrylate. The maximum compressive strength of the restoratives utilizing this approach was 35,000 p.s.i.

SUMMARY OF THE INVENTION

The primary object of the present invention is to provide improved thermosetting aromatic and alicyclic polyacrylate molding compositions having improved handling characteristics and higher crosslink densities as well as greater compressive strength and other physical properties not obtained previously. It is a particular object of this invention to provide improved dental restorative compositions utilizing the improved resin formulations of this invention which have improved handling characteristics, very satisfactory gel and set times, high compressive and flexural strengths, low degrees of shrinkage on cure, and low coefficients of thermal expansion. In addition, they have relatively low water adsorption. Such improved resin compositions are obtained by mixing with the aromatic and alicyclic polyacrylate compound from 25% to 90% by weight of a compound of the formula

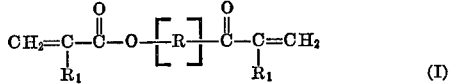 (I)

wherein
$R_1$ is hydrogen or alkyl of 1 to 4 carbons, hydrogen or methyl being preferred, and methyl most preferred;
R is:
(a)

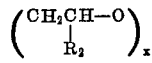

wherein x is an integer of 1 to 5, preferably 3, and $R_2$ is hydrogen or alkyl of 1 to 4 carbon atoms, hydrogen being preferred;
(b) $CH_2(CH_2)_yCH_2O$ wherein y is an integer of 1 or 2;
(c)

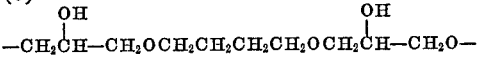

or
(d)

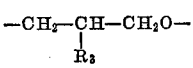

wherein $R_3$ is OH or

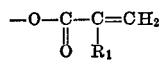

and $R_1$ has the same meaning as above.

In the above formula, the preferred meaning of R is (a).

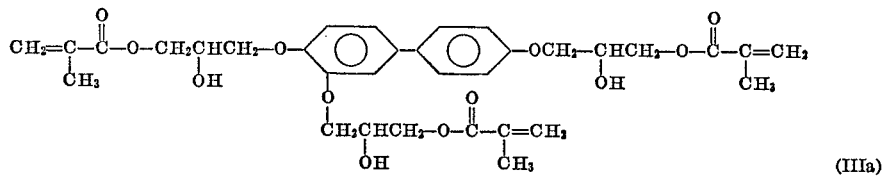

DESCRIPTION OF THE PREFERRED EMBODIMENTS

As indicated, this invention provides improved thermosetting acrylic resin compositions comprised of aromatic and alicyclic polyacrylates together with from 25% to 90% by weight of aliphatic and aliphatic ether polyacrylate compounds as defined in Formula I above.

It is preferred that the aromatic polyacrylate contain at least 2 aromatic rings in its structure and likewise that the alicyclic polyacrylate contain at least 2 alicyclic rings in its structure. Among the preferred members of the diaromatic polyacrylates is the BIS-GMA mentioned above, or the dimethacrylate derived from the ethylene or propylene oxide adduct of bisphenol-A.

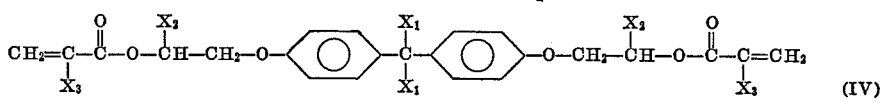

A preferred dialicyclic is the dimethacrylate derived from hydrogenated bisphenol.

Representative of aromatic and alicyclic polyacrylates which are utilized in the practice of this invention, besides those mentioned above, are compounds such as:

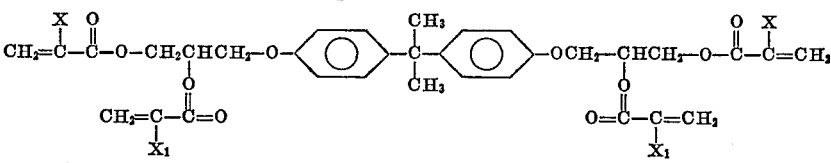

wherein each of X and $X_1$ may independently be hydrogen, lower alkyl, i.e., straight or branched chain alkyl of 1 to 4 carbon atoms, methyl being preferred, or halogen, chlorine being preferred. A preferred example of a compound of Formula II is:

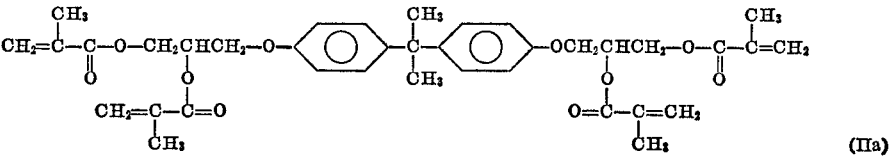

which may be named bisphenol-A-bis(2,3-dimethacrylatopropyl ether);

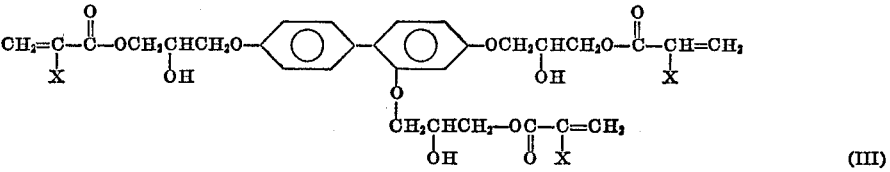

wherein X is hydrogen, lower alkyl, i.e., straight or branched chain alkyl of 1 to 4 carbon atoms, preferably methyl, or halogen, chlorine being preferred. The preferred meaning of X is methyl. A preferred example of a compound of Formula III is:

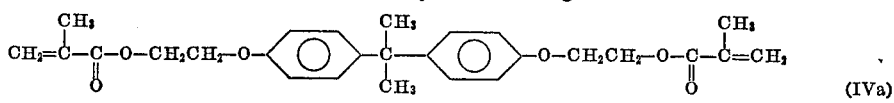

The acrylates of Formula II may be prepared by reacting BIS-GMA with an excess of an acryl chloride in the presence of a tertiary amine such as triethylamine or pyridine.

The compounds of Formula III may be prepared by reacting the triglycidyl ether of trihydroxy biphenyl with methacrylic acid in the presence of a catalyst such as a tertiary amine, triphenylphosphine, or triphenylantimony.

Also useful are compounds of the formula:

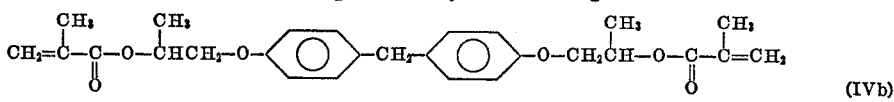

wherein $X_1$, $X_2$, and $X_3$ are either hydrogen or lower alkyl groups preferably comprising 4 or less carbon atoms. Preferred compounds of Formula IV are:
bisphenol-A-bis(2-methacrylatoethyl)ether which is represented by the following formula:

(IVa)

and bisphenol-F-bis(2-methacrylatopropyl)ether which is represented by the following formula:

(IVb)

The diacrylates of Formula IV may be prepared by either of two methods. The first of these is the reaction of an acryl chloride with an appropriate bis-alcohol compound in accordance with the following reaction

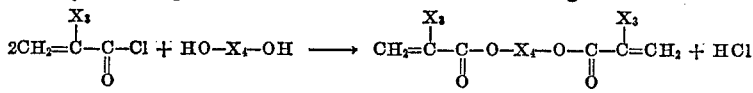

In this reaction a base may be used to remove hydrogen chloride as it forms. The base may be, for example, a tertiary amine such as triethyl amine or pyridine. On the other hand, the bis-alcohol could be pre-reacted with a base to form, for example, the disodium salt thereof which could in turn be reacted with the acid chloride.

A second method for forming the diacrylates of Formula IV is the transesterification of the appropriate bis-alcohol with lower alkyl esters of the acrylic acids in accordance with the following reaction

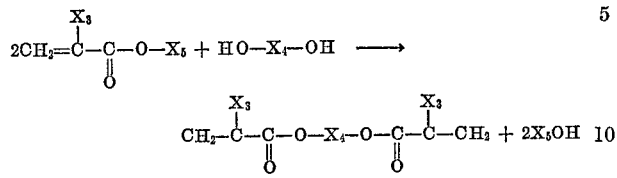

In this method any lower alkyl ester can be used; however, in practice, $X_5$ is preferably a methyl group since these methyl esters are more readily available and the product methyl alcohol is the most volatile.

Additional polyacrylates useful in the practice of this invention are compounds of the following formulae:

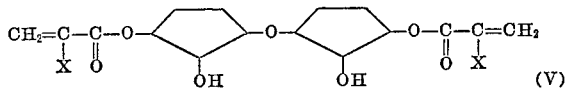

(V)

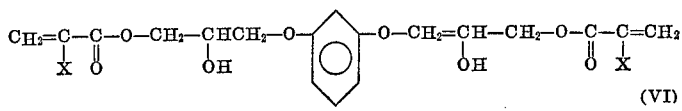

(VI)

and

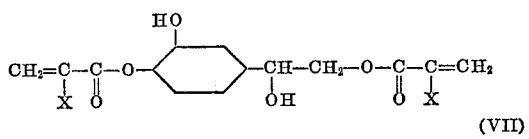

(VII)

wherein in each of the Formulae V–VII, X is hydrogen, lower alkyl, or halogen. In the foregoing Formulae V–VII, the preferred meaning of X is methyl.

Of the compounds falling within the general Formulae V–VII above which are useful in the practice of this invention, three compounds are particularly preferred. They are:

(a)

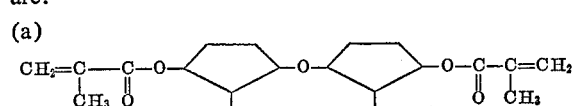

which is bis-(3-methacrylato-2-hydroxycyclopentyl)ether;

(b)

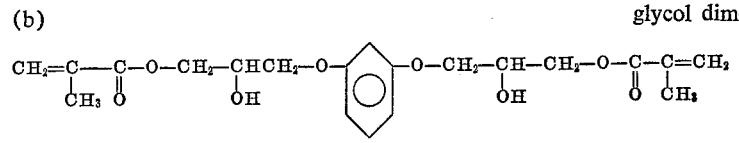

which is 1,3-bis(3-methacrylato-2-hydroxypropoxy)benzene; and (c)

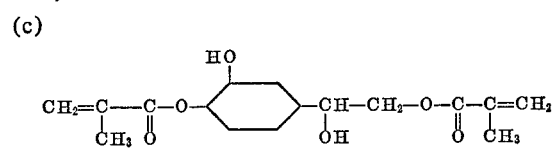

which is 1-(2-methacrylato-1-hydroxyethyl)-3-hydroxy-4-methacrylatocyclohexane.

Other representative compounds are of the formula:

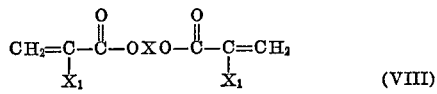

(VIII)

wherein X is selected from

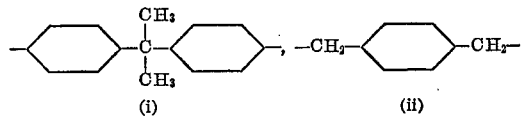

(i)        (ii)

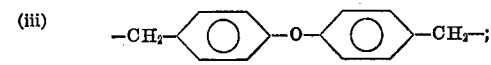

(iii)

and (iv)

and $X_1$ is hydrogen, lower alkyl, or halogen.

In the foregoing Formula VIII, the preferred meaning of $X_1$ is methyl. X preferably is (i); thus the compound

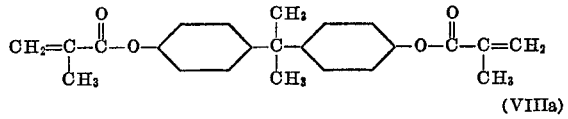

(VIIIa)

which is named 2,2-bis(4-methacrylatocyclohexyl)propane, is most preferred of those of Formula VIII.

The compounds of Formula VIII may be prepared by the reaction of an acryl chloride or derivatives thereof with the appropriate diol according to methods well known to those skilled in the art. The reaction is generally carried out in the presence of a tertiary amine such as triethylamine or pyridine as an acceptor for the hydrogen chloride generated in the reaction.

According to the present invention, from 25% to 90% of the reactive monomers of Formula I can be employed with the aromatic polyacrylate or alicyclic polyacrylate compounds.

As the amount of polyacrylate of the above formula is reduced below 25% by weight, the compositions tend to become unduly viscous, and a decrease in the desired physical properties of the cured resin is noted. As one exceeds the maximum of 90% by weight, objectionable colors are formed as well as changes in physical properties.

The preferred range of the polyacrylates of Formula I is from 30% to 70% by weight of the resin composition, with the most preferred range being 40% to 60% by weight of the resin composition.

Especially preferred among the polyacrylate compounds of Formula I above are diethylene glycol dimethacrylate, triethylene glycol dimethacrylate, tetraethylene glycol dimethacrylate, and the dimethacrylate formed by the reaction of methacrylic acid with the diglycidyl ether of butane-diol.

All of the compounds defined by Formula I are available commercially with the exception of the dimethacrylate or diacrylate of the diglycidyl ether of butane-diol, which can be prepared readily by those skilled in the art, for example, by the reaction of an acrylic acid or methacrylic acid with the diglycidyl ether of butane-diol.

The resin compositions of this invention are usually cured by the addition of an activator, or accelerator, and a catalyst. For most applications, a room temperature cure in about one-half minute to two hours is desirable.

The amount of accelerator depends upon the particular resin compositions which are utilized and the working time which is desired. Generally accelerators can be employed in amounts of 0.001 to 5% by weight of the monomeric resins utilized. In most cases, the amount of accelerator will range from about 0.5 to 2% by weight of the monomeric resins utilized. Usually about 0.5 to 1% by weight of the resin of an activator is sufficient. Examples of accelerators which have been used are dimethylpara-toluidine, para-toluene sulfinic acid, para-tolyl diethanolamine and other tertiary amines which are well known in the art.

Catalysts are usually employed in amounts of about 0.2% to about 5% by weight of the monomeric resins. Generally, amounts of about 0.25% to 2.5% by weight of the monomeric resins are satisfactory.

Peroxide catalysts are preferably employed in amounts ranging from about 1% to 2% by weight based on the weight of the resin monomers present.

While peroxide catalysts such as benzoyl peroxide are preferred, other catalysts well known in the art may be employed.

As indicated, the polyacrylic resin compositions of this invention when mixed with finely divided particles of an inorganic filler can be utilized as a restorative filler material, or as a dental cement, for example, for bridges and crowns in place of commonly used silicate cements. They may be used without filler as a sealant for fissures in tooth surfaces.

Where finely divided filler is employed, it is usually employed in amounts varying from about 50% to 80% or more by weight of the overall resin-filler composition.

A composition used as a filling material in lieu of amalgam commonly used by the dentist would for example contain approximately 80% by weight of an inorganic filler and a composition used as a dental adhesive would contain on the order of 65% by weight of inorganic filler. Among the advantages of the resin compositions of the present invention is their ability to "wet" and carry large amounts of filler material, thus providing restoratives of extremely high tensile strength among other desirable properties of a dental restorative material.

Where a filler is employed, the filler may be any finely divided inorganic solid which when dispersed through the binder system will give improved structural strength when the binder system is polymerized into a cured resin. The finely divided filler may have a particle size generally in the range of about 1 micron to about 150 microns. The preferred range is from about 1 micron to 30 microns. The best results are obtained where the inorganic filler is treated with a keying agent to improve the bond between the organic polymer binder and the surfaces of the finely divided filler particles. Keying agents which have been found highly suitable are the ethylenically unsaturated organosilane finishing or keying agents where the filler is fused silica, glass, aluminum oxide, or crystalline quartz and the binder system is of the type described. The finely divided filler may be treated with the keying agent, for example, in the manner described in U.S. Pat. 3,066,112 wherein an aqueous solution of tris-(2-methoxyethoxy)vinyl silane is catalyzed with sodium hydroxide to give a pH of 9.3 to 9.8, and the filler treated with this solution, for example, one-half percent of the silane by weight of fused quartz. A slurry so formed is dried at about 125° C. and cooled.

Where more translucent filling materials are desired, as for the filling of anterior teeth, glass beads, or a mixture of glass beads and quartz may be used.

By way of illustration, when the resin compositions of this invention are empoyed in a dental restorative composition, about 0.5 to 1% by weight based on the resin binder, or more, of an accelerator, such as, for example, N,N-di-(2-hydroxyethyl)-p-toluidine is added to the resin. A suitable catalyst, such as, for example, 1 to 2% by weight of benzoyl peroxide based upon the weight of the resin binder, is mixed into the silane treated filler material. The filler material containing the catalyst, and the resin containing the accelerator are then thoroughly mixed together and promptly placed in a cavity to be filled. The binder will polymerize at mouth temperature to harden the filling within several minutes. Fillings formed from the restorative compositions of this invention have very high compressive strengths.

A useful dental fissure sealant utilizing the compositions of this invention comprises for example about 40% by weight of the resin composition of BIS-GMA and about 60% by weight of triethylene glycol dimethacrylate.

Dental materials utilizing the resin compositions of this invention are more resistant to staining and discoloration than prior materials utilizing acrylic resins, it is believed, because they contain a significantly lower percentage of unreacted acrylic groups.

In addition, many prior art dental restoratives utilizing acrylic resins, even in the cured state, will impart a relatively high degree of acidity when placed in water. In contrast, water in which restoratives utilizing the resin compositions of this invention are placed remains essentially neutral.

The resin compositions of this invention when cured also have high compressive strengths, low shrinkage on cure, generally low coefficients of expansion, and good color which is generally light and clear, and have a slow response to ultraviolet light. They have a generally low degree of water-adsorption and fewer points of stress than the prior art resins, due to more uniform and a higher degree of cure.

The following examples describing certain representative embodiments of this invention will serve to further illustrate the nature of this invention. It is to be understood that the examples are merely illustrative, and intended to enable those skilled in the art to practice the invention in all of the embodiments flowing therefrom and do not in anyway limit the scope of the invention defined in the claims. Unless otherwise specified, the relationship of parts by weight to parts by volume is that of grams to cubic centimeters, and temperatures are degrees centigrade.

EXAMPLE 1

30 parts by weight of triethylene glycol dimethacrylate, 70 parts of bisphenol-A-bis(3-methacrylato - 2 - hydroxypropyl) ether, 2 parts benzoyl peroxide catalyst, 1.5 parts of N,N-di-(2-hydroxyethyl)-p-toluidine as an accelerator, and 405 parts of finely divided silica ($5\mu$ to $150\mu$) which has been treated with an aqueous solution of tris(2-methoxyethoxy)vinyl silane as described above are mixed together. The mixture gelled in about 135 seconds and after one hour had a compressive strength of 47,400 p.s.i.

EXAMPLES 2-4

The procedure of Example 1 is repeated, but employing different proportions of triethylene glycol dimethacrylate and bisphenol-A-bis(3-methacrylato - 2 - hydroxypropyl) ether as indicated in the following table and yielding the compressive strengths shown. The amounts of accelerator are varied to yield gel times of approximately 135 seconds.

| Example | TEG DM/ BIS-GMA* | Compressive strength |
|---|---|---|
| 2 | 40/60 | 44,200 |
| 3 | 50/50 | 48,600 |
| 4 | 60/40 | 49,400 |

*Parts of triethylene glycol dimethacrylate to parts bisphenol-A-bis(3-methacrylato-2-hydroxypropyl) ether

EXAMPLE 5

A mixture of 50 parts BIS-GMA, 50 parts ethylene glycol dimethacrylate, 1.5 parts N,N-di-(2-hydroxyethyl)-p-toluidine, 0.1 part butylated hydroxytoluene, and 406 parts of finely divided quartz, and 25.4 parts of hydrophobic colloidal silica (Aerosil R-972) are mixed in equal amounts with a mixture of 50 parts BIS-GMA, 50 parts ethylene glycol dimethacrylate, 0.1 part butylated hydroxytoluene, 406 parts of finely divided quartz, 25.4 parts of colloidal silica (Aerosil R-972), and 2.4 parts of benzoyl peroxide. The resulting mixture gels in about 210 seconds and sets in 240 seconds. The sample is placed in water at 37° C. for 24 hours after which it has a compressive strength of 41,390 p.s.i., a tensile strength of 6,180 p.s.i. and a modulus of elasticity (compressive mode) of 1,212,940 p.s.i.

EXAMPLES 6–9

The procedure of Example 5 is repeated, but employing the various glycol dimethacrylates shown in the following table with the results shown in the table.

| Example | Monomer | Reactivity | | Mechanical properties—24 hrs., 37° C. water | | |
|---|---|---|---|---|---|---|
| | | Gel time, sec. | Set time, sec. | Tensile strength, p.s.i. | Compressive strength, p.s.i. | Modulus of elasticity compressive mode, p.s.i |
| 6 | Diethylene glycol dimethacrylate | 180 | 210 | 7,179 | 37,630 | 1,145,466 |
| 7 | Triethylene glycol dimethacrylate | 135 | 165 | 6,740 | 37,422 | 1,145,500 |
| 8 | Tetraethylene glycol dimethacrylate | 135 | 165 | 6,804 | 35,200 | 1,008,520 |
| 9 | Polyethylene glycol dimethacrylate [1] | 150 | 210 | 6,928 | 35,980 | 1,085,160 |

[1] Molecular weight of polyethylene glycol averaged about 200.

EXAMPLE 10

A mixture of 101 parts of 1,4-diglycidoxybutane, 86 parts of methacrylic acid, 1 part of triphenylphosphine, and 1 part of triphenylstilbene is heated for 3 days at 40° C., 3 days at 65° C., and 1 day at 90° C., after which time there is obtained an amber viscous liquid having a refractive index of $N_D^{23}$ 1.4768 and the weight per epoxy group has gone up to 6,250, the reaction being 97% complete. The dimethacrylate obtained is employed in the resin compositions of this invention.

EXAMPLE 11

To a mixture of 60 parts BIS-GMA, 40 parts triethylene glycol dimethacrylate, 0.1 part butylated hydroxytoluene and 1.5 parts of N,N-di-(2-hydroxyethyl)-p-toluidine, there is added a mixture of 60 parts BIS-GMA, 40 parts triethylene glycol dimethacrylate, 2.5 parts benzoyl peroxide, and 640 parts of finely divided silica (325 mesh) which has been silane treated as described above. The resulting mixture gels in about three minutes. The cured composition has a Rockwell hardness of 100, a compressive strength of 45,000 p.s.i., tensile strength of 7,000 p.s.i., and flexural strength of 15,000 p.s.i. The composition is an excellent dental restorative.

EXAMPLE 12

The procedure of Example 11 is repeated, but employing 405 parts of silica instead of 640 parts. The cured composition has a compressive strength of 40,000 p.s.i., a tensile strength of 8,200 p.s.i., a flexural strength of 15,000, an adhesive strength to tooth structure (shear) of 800 p.s.i., and to gold (lap shear) of 3,000 p.s.i. The composition is an excellent crown and bridge adhesive.

EXAMPLE 13

An effective dental fissure sealant is prepared by mixing together 40 parts BIS-GMA, 60 parts triethylene glycol dimethacrylate, 1.5 parts N,N - di - (2 - hydroxyethyl)-p-toluidine, and 0.1 part butylated hydroxytoluene, the resulting mixture being applied to a dental surface which has been brushed with a solution of benzoyl peroxide in ethyl ether, after a one minute etch of the dental surface with a cleanser such as 50% citric acid. The cured composition has a Rockwell hardness of 90 and a compressive strength of 18,000 p.s.i. after a 24-hour cure.

What is claimed is:

1. A composition of matter comprising from about 25% to about 90% by weight of (A) a compound of the formula:

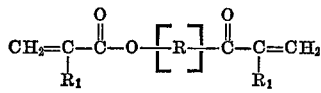

wherein
$R_1$ is hydrogen or alkyl of 1 to 4 carbons;
R is:
(a)

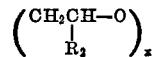

wherein $x$ is an integer of 1 to 5, and $R_2$ is hydrogen or an alkyl of 1 to 4 carbon atoms;
(b) $CH_2(CH_2)_yCH_2O$ wherein $y$ is an integer of 1 or 2;
(c)

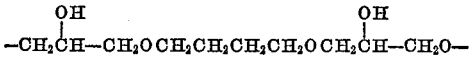

or
(d)

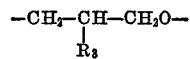

wherein $R_3$ is OH or

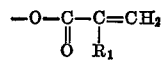

and $R_1$ has the same meaning as above;
and 10% to 75% by weight of (B) an aromatic or alicyclic polyacrylate compound selected from the group consisting of: bisphenol-A-bis(3-methacrylato-2-hydroxypropyl) ether;

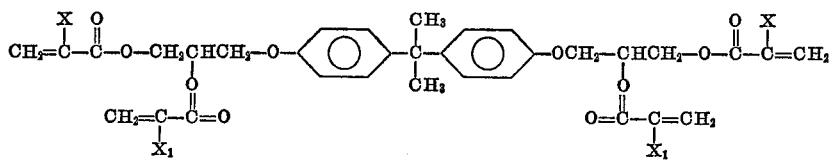

wherein each of X and $X_1$ may independently be hydrogen, lower alkyl, or halogen;

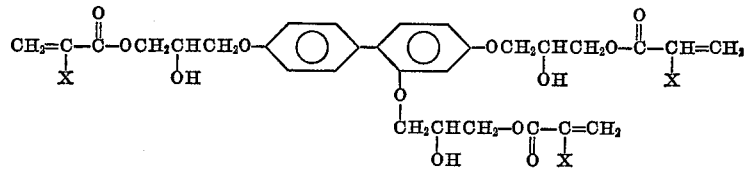

wherein X is hydrogen, lower alkyl, or halogen;

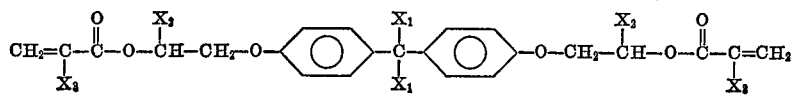

wherein $X_1$, $X_2$, and $X_3$ are each hydrogen or lower alkyl;

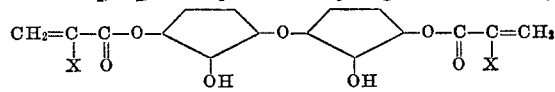

wherein X is hydrogen, lower alkyl, or halogen;

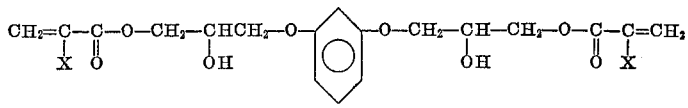

wherein X is hydrogen, lower alkyl, or halogen;

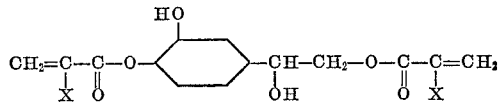

wherein X is hydrogen, lower alkyl, or halogen;

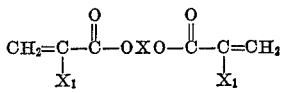

wherein X is selected from

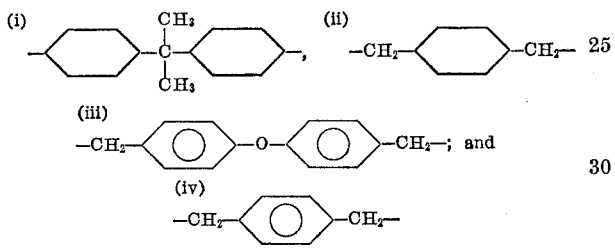

and wherein $X_1$ is hydrogen, lower alkyl, or halogen.

2. A composition of matter as claimed in claim 1 wherein R is (a) and $R_2$ is hydrogen.

3. A composition of matter as claimed in claim 1 wherein R is (b) and y is 2.

4. A composition of matter as claimed in claim 1 wherein R is (c).

5. A composition of matter as claimed in claim 1 wherein R is (d).

6. A composition of matter as claimed in claim 2 wherein x is 3.

7. A composition of matter as claimed in claim 6 wherein $R_1$ is methyl.

8. A composition of matter as claimed in claim 1 wherein B is bisphenol-A-bis(3-methacrylato-2-hydroxypropyl) ether.

9. A composition of matter as claimed in claim 8 wherein R is (a) and $R_2$ is hydrogen.

10. A composition of matter as claimed in claim 9 wherein $R_1$ is methyl.

11. A composition of matter as claimed in claim 1 wherein (A) comprises from 30 to 70% by weight and (B) comprises from 70 to 30% by weight of the composition.

12. A dental restorative composition comprising a finely divided filler and a binding amount of a thermosetting binder admixed therewith, said binder comprising from about 25% to about 90% by weight of (A) a compound of the formula:

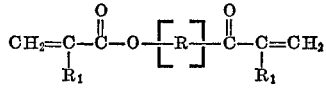

wherein
$R_1$ is hydrogen or alkyl of 1 to 4 carbons;
R is:
(a)

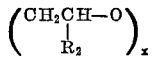

wherein x is an integer of 1 to 5, and $R_2$ is hydrogen or an alkyl of 1 to 4 carbon atoms;

(b) $CH_2(CH_2)_yCH_2O$ wherein y is an integer of 1 or 2;

(c)

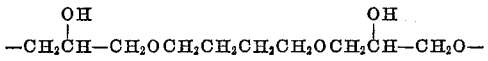

or
(d)

wherein $R_3$ is OH or

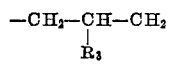

and $R_1$ has the same meaning as above;
and 10% to 75% by weight of (B) an aromatic or alicyclic polyacrylate compound as defined in claim 1.

13. A dental restorative composition as claimed in claim 12 wherein A comprises from 30 to 70% by weight and B comprises from 70 to 30% by weight of the composition.

14. A dental restorative composition as claimed in claim 13 wherein R is (a).

15. A dental restorative composition as claimed in claim 14 wherein $R_2$ is hydrogen and x is 3.

16. A dental restorative composition as claimed in claim 15 wherein $R_1$ is methyl.

17. A dental restorative composition as claimed in claim 14 wherein B is bisphenol-A-bis(3-methacrylato-2-hydroxypropyl) ether.

18. A dental restorative composition as claimed in claim 17 wherein A comprises from about 50 to about 70% and B comprises from about 30% to about 50% by weight of the binder and wherein said binder comprises from about 20% to about 50% by weight of said restorative composition and said finely divided filler comprises from 50% to 80% by weight of said restorative composition.

19. In a method for the direct filling of a cavity in a tooth, which method includes filling said cavity with an initially liquid, settable filling material comprising a finely divided filler and a binder composition admixed therewith, and thereafter permitting said material to harden in situ, the improvement which comprises utilizing as the predominant component of said binder composition a composition comprising from about 25% to about 90% by weight of (A) a compound of the formula:

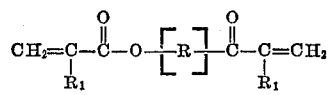

wherein
$R_1$ is hydrogen or alkyl of 1 to 5 carbons;
R is:
(a)

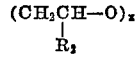

wherein x is an integer of 1 to 4, and $R_2$ is hydrogen or an alkyl of 1 to 4 carbon atoms;
(b) $CH_2(CH_2)_yCH_2O$ wherein y is an integer of 1 or 2;
(c)

or (d)

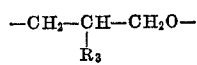

wherein R₃ is OH or

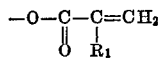

and R₁ has the same meaning as above; and 10% to 75% by weight of (B) an aromatic or alicyclic polyacrylate compound as defined in claim 1.

20. A method as claimed in claim 19 wherein A comprises from 30 to 70% by weight and B comprises from 70 to 30% by weight of said binder composition.

21. A method as claimed in claim 20 wherein R is (a).

22. A method as claimed in claim 21 wherein $R_2$ is hydrogen and $x$ is 3.

23. A method as claimed in claim 19 wherein $R_1$ is methyl.

24. A method as claimed in claim 23 wherein B is bisphenol-A-bis(3-methacrylato-2-hydroxypropyl) ether.

25. In a method for sealing fissures in tooth surfaces which comprises including the steps of applying to the surface of the tooth a settable resin composition and permitting said resin composition to harden in situ, the improvement which comprises utilizing as the predominant component of said resin composition a composition comprising from about 25% to about 90% by weight of (A) a compound of the formula:

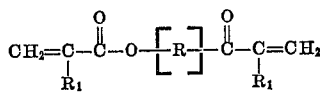

wherein
$R_1$ is hydrogen or alkyl of 1 to 4 carbons;
R is:

(a)

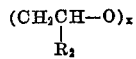

wherein $x$ is an integer of 1 to 5, and $R_2$ is hydrogen or an alkyl of 1 to 4 carbon atoms;

(b) $CH_2(CH_2)_yCH_2O$ wherein $y$ is an integer of 1 to 2;

(c)

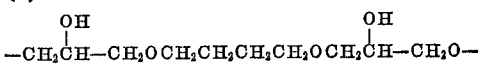

or (d)

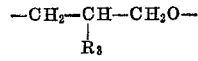

wherein R₃ is OH or

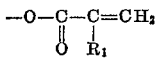

and R₁ has the same meaning as above; and 10% to 75% by weight of (B) an aromatic or alicyclic polyacrylate compound as defined in claim 1.

26. A method as claimed in claim 25 wherein A is triethylene glycol and comprises from 50 to 70% by weight of said resin composition and B is bisphenol-A-bis(3-methacrylato-2-hydroxypropyl) ether and comprises 50 to 30% by weight of the resin composition.

27. A method for sealing fissures in tooth surfaces which comprises first applying to the surface of a tooth a solution of a peroxide catalyst, then applying to said surface over said catalyst a liquid resin composition as defined in claim 1, and thereafter permitting said composition to harden in situ.

28. A method as claimed in claim 27 wherein said catalyst is benzoyl peroxide and wherein said resin composition comprises 40 parts by weight bisphenol-A-bis(3-methacrylato-2-hydroxypropyl) ether and 60 parts by weight triethylene glycol dimethacrylate.

References Cited

UNITED STATES PATENTS 2,628,210  2/1953  Etchason _____ 260—45.4
3,539,533  11/1970  Lee _____ 260—47

JOSEPH L. SCHOFER, Primary Examiner

C. A. HENDERSON, JR., Assistant Examiner

U.S. Cl. X.R.

32—15; 106—35; 260—41 A, 86.1 E, 468, 473, 476 R, 486 R, Dig. 36

UNITED STATES PATENT AND TRADEMARK OFFICE
CERTIFICATE OF CORRECTION

PATENT NO. : 3,751,399
DATED : August 7, 1973
INVENTOR(S) : Henry L. Lee, Jr. and Donald G. Stoffey It is certified that error appears in the above-identified patent and that said Letters Patent are hereby corrected as shown below:

Column 3, formula II, those portions of the formula reading

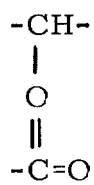        should read        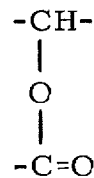

Column 10, claim 1, lines 56 to 60, those portions of the formula reading

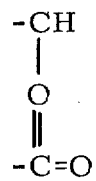        should read        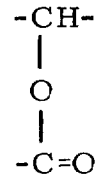

Signed and Sealed this twenty-fifth Day of November 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,751,399  Dated August 7, 1973

Inventor(s) Henry L. Lee, Jr. and Donald G. Stoffey

It is certified that error appears in the above-identified patent and that said Letters Patent are hereby corrected as shown below:

Column 3, Formula III, lines 67-72, the portion of the formula

Column 10, claim 1, lines 69-75, the portion of the formula

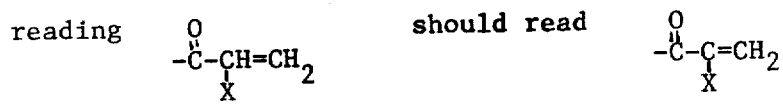

Column 14, claim 26, line 17, "triethylene glycol" should read --triethylene glycol dimethacrylate--.

Signed and Sealed this

First Day of April 1980

[SEAL]

Attest:

SIDNEY A. DIAMOND

Attesting Officer    Commissioner of Patents and Trademarks

Disclaimer 3,751,399.—*Henry L. Lee, Jr.*, San Marino, and *Donald G. Stoffey*, Hàcienda Heights, Calif. POLYACRYLATE RESIN COMPOSITIONS. Patent dated Aug. 7, 1973. Disclaimer filed Nov. 23, 1979, by the assignee, *Lee Pharmaceuticals*.

Hereby enters this disclaimer to claims 1, 2 and 8–11 of said patent.

[*Official Gazette, April 8, 1980.*]